Patented Dec. 17, 1940

2,225,285

UNITED STATES PATENT OFFICE 2,225,285

COMPLEX ORGANIC PHOSPHATE

Clarence L. Moyle, Midland, Mich., assignor to The Dow Chemical Company, Midland, Mich., a corporation of Michigan No Drawing. Application August 11, 1938,
Serial No. 224,302

6 Claims. (Cl. 260—461)

This invention concerns certain new and unusually complex organic phosphates having the general formula,

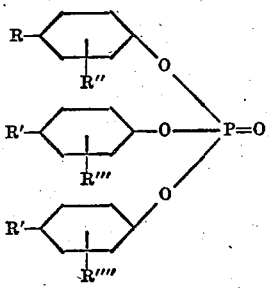

wherein R is a cycloalkyl radical or another hydrocarbon radical containing at least four carbon atoms and attached through a tertiary carbon atom with the benzene nucleus, R' is hydrogen or a cycloalkyl radical, an aryl radical, or a hydrocarbon radical containing at least four carbon atoms and attached through a tertiary carbon atom with the benzene nucleus, R'' is a tertiary alkyl, cycloalkyl, or aryl radical, R''' is hydrogen or a tertiary alkyl, cycloalkyl, or aryl radical and the benzene nuclei shown contain at least four such hydrocarbon substituents, at least two of said benzene nuclei being so-substituted.

The phosphates having the above formula are in most instances extremely viscous liquids or non-crystalline resins at room temperature. They are substantially non-flammable and are useful for treatment of fabrics, wood pulp, etc., to reduce their flammability. They are also useful as plasticizers for various plastic compositions and have special utility as plasticizers for cellulose ethers. Most plasticizers, when incorporated with a cellulose ether, e. g., ethyl cellulose or benzyl cellulose, tend to soften the ether to an undesirable extent. However, when one of the complex organic phosphates provided by this invention is incorporated with a cellulose ether in the proportion necessary for satisfactory plasticizing action, it has little softening effect and in many instances produces a plasticized product which at room temperature is harder than the ether alone. These facts are fully brought out in the copending application of Bass et al., Serial No. 224,320, filed August 11, 1938, wherein cellulose ether compositions containing the new complex phosphates are described and claimed.

The new organic phosphates are prepared by reacting a phosphorus oxyhalide, e. g., phosphorus oxychloride or phosphorus oxybromide, with the substituted phenol or phenols required to yield the desired product or with alkali metal salts of such phenols.

When a symmetrical product, i. e., a phosphate containing three identical aromatic radicals linked with the phosphate group, is desired, the phosphorus oxyhalide is reacted directly with approximately three molecular equivalents of the necessary phenol. When a mixed phosphate, i. e., one containing dissimilar aromatic radicals linked with the phosphate group, is desired, the phosphorus oxyhalide is first reacted with one or two molecular equivalents of a given phenol corresponding to one of the aromatic groups desired in the product and the resultant aromatic phosphoric acid halide is further reacted with a different phenol corresponding to the other aromatic radical desired in the product. In some instances the phosphorus oxyhalide may simultaneously be reacted with two or more different phenols, but a product of greatest purity is usually obtained when the reactions for production of a mixed phosphate are carried out in the consecutive manner just stated.

In the preparation of a mixed triaryl phosphate by first reacting a phosphorus oxyhalide with one phenol to form a corresponding monoaryl phosphoric acid dihalide or diaryl phosphoric acid monohalide and subsequently reacting the acid halide with a different phenol, it is preferable, in formation of the intermediate aryl phosphoric acid halide, to employ the phenol in a proportion slightly lower than that theoretically required, since the yield of such intermediate product is generally highest when this is done. It is also desirable, although not necessary, to purify the intermediate aryl phosphoric acid halide product by distillation or otherwise before reacting the same with the second substituted phenol, since the desired mixed triaryl phosphate product is thereby obtained in maximum yield and most readily purifiable form.

Each of the reactions just described is carried out by heating a mixture of the necessary reactants to a reaction temperature preferably in the presence of a catalyst such as metallic calcium, magnesium, or aluminum or a chloride of magnesium, aluminum, or iron, etc. The temperature to which the mixture must be heated in order to obtain rapid reaction is, of course, dependent upon the particular reactants employed, the relative proportions of the reactants, the presence or absence of a catalyst, etc. However, since the reaction is accompanied by evolution of hydrogen halide, it is necessary merely to heat the mixture to a temperature at which hydrogen halide gas is evolved. The reactions are preferably carried out at the lowest convenient reaction temperature, usually below 300° C. and preferably between 120° and 200° C.

After the reactions for formation of the desired triaryl phosphate are completed, the hot reaction mixture is blown with air to remove hydrogen halide and other volatile impurities. If desired, it may, in many instances, be further purified by distillation under vacuum.

In the following examples, which illustrate but do not limit the invention, the well known biphenyl radical is frequently referred to as the "xenyl" radical. This nomenclature is well established and is employed for sake of rendering most clear and simple the names of the complex phosphates disclosed. The numbers of the carbon atoms in the xenyl radical are shown in the following formula,

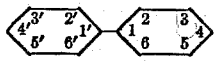

Example 1

A mixture of 0.15 gram mol of 4-tertiarybutyl-2-phenylphenol and 0.075 gram mol of 2-xenyl phosphoric acid dichloride, and 0.5 gram of magnesium turnings was heated at temperatures varying from 92° to 166° C. until hydrogen chloride was no longer evolved. The mixture was then dissolved in chlorobenzene, washed with water, and distilled under vacuum. There was obtained 34 grams (0.051 mol) of di-(5-tertiarybutyl-2-xenyl) 2-xenyl phosphate distilling at temperatures between 356° and 360° C. at an absolute pressure of approximately 7.6 millimeters. The product was a yellow resinous solid at room temperature. It softened sufficiently to flow at temperatures between 53° and 56° C. It had the formula,

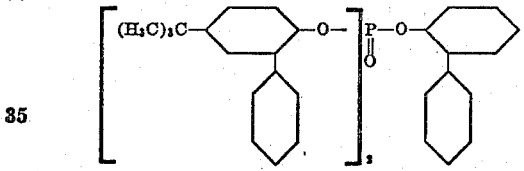

Example 2

A mixture of 0.5 gram mol of 4-tertiarybutyl-2-phenylphenol, 0.5 gram mol of phosphorus oxychloride, 0.5 gram of magnesium turnings was heated at temperatures between 105° and 115° C. for 3 hours, i. e., until hydrogen chloride was no longer evolved. The mixture was then cooled to 100° C. and 1 gram mol of 4-tertiarybutyl phenol was added, after which the mixture was further heated at temperatures between 115° and 205° C. until evolution of hydrogen chloride had ceased. The product was purified as in Example 1. There was obtained 247 grams (0.434 mol) of 5-tertiarybutyl-2-xenyl di-(4-tertiarybutylphenyl) phosphate having the formula,

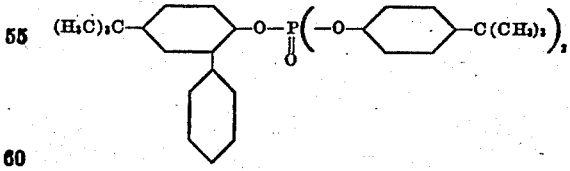

The product distilled at temperatures between 300° and 325° C. at 5 millimeters absolute pressure as an odorless pale yellow viscous liquid which on standing at room temperature changed to a soft resin having a pour point of 40° C. Its specific gravity at 25° C./4° C. was 1.117 and at 150° C./4° C. was 1.004. It possessed a flash point of 277° C. and a fire point of 385° C.

Example 3

A mixture of 1 gram mol of 2-xenyl phosphoric acid dichloride, 1 gram mol of 4-tertiarybutyl phenol, 1 gram mol of 4-tertiarybutyl-2-phenylphenol, and 1 gram of magnesium turnings was heated at temperatures from 130° to 254° C. for 3 hours, after which the product was purified as in Example 1. There was obtained 513 grams (0.877 mol) of (5-tertiarybutyl-2-xenyl) (2-xenyl) (4-tertiarybutylphenyl) phosphate which distilled at temperatures between 323° and 345° C. at 6.5 millimeters absolute pressure and which on cooling to room temperature changed to an odorless pale yellow hard resin. The product had the formula,

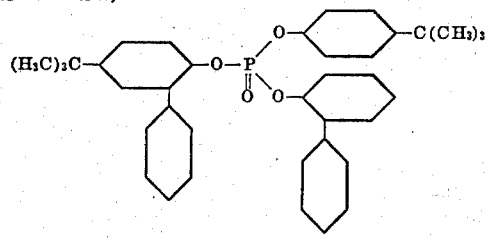

Example 4

A mixture of 0.15 gram mol of phenyl phosphoric acid dichloride, 0.3 gram mol 4-cyclohexyl-2-phenylphenol, and 0.5 gram of magnesium chloride was heated at temperatures varying from 155° to 300° C. for 8 hours. The product was then purified as in Example 1. There was obtained 60.1 grams (0.141 mol) of di-(5-cyclohexyl-2-xenyl) phenyl phosphate having the formula,

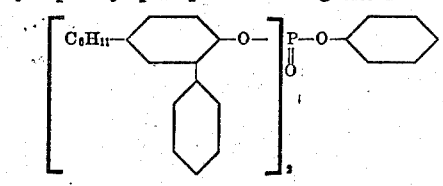

The product distilled at temperatures between 340° and 344° C. at 7 millimeters absolute pressure and was at room temperature a pale yellow resin.

Example 5

A mixture of 0.2 gram mol of 4-tertiarybutyl-2-phenylphenol, 0.066 gram mol of phosphorus oxychloride, and 0.5 gram of magnesium turnings was heated at temperatures varying from 114° to 162° C. for 5.5 hours. The product was purified as in Example 1. There was obtained 26.1 grams (0.036 mol) of tri-(5-tertiarybutyl-2-xenyl) phosphate having the formula,

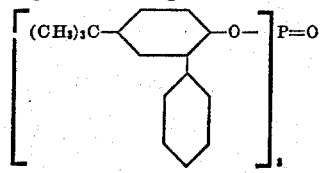

The product distilled at temperatures between 344° and 366° C. at 7.5 millimeters absolute pressure and was at room temperature a hard pale yellow resin.

Example 6

A mixture of 0.25 gram mol of phenyl phosphoric acid dichloride, 0.5 gram mol of 2-cyclohexyl-4-phenylphenol, and 0.3 gram of magnesium chloride was heated for 3 hours at temperatures which were gradually raised from 178° to 246° C. The product was separate as in Example 1. There was obtained 0.16 gram mol of di-(3-cyclohexyl-4-xenyl) phenyl phosphate having the formula,

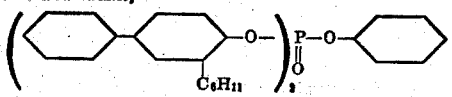

The product distilled at temperatures of 371° to 395° C. at 9.5 millimeters pressure and was at room temperature a hard yellowish resin.

Example 7

A mixture of 0.25 gram mol of para-(alpha-cumenyl) phenol (also known as "cumyl phenol"), 0.75 gram mol of phosphorus oxychloride, and 0.3 gram of magnesium chloride was heated at temperatures between 96° and 107° C. until hydrogen chloride no longer was evolved. Unreacted phosphorus oxychloride was distilled off and 0.5 gram mol of para-tertiarybutyl-ortho-cyclohexyl-phenol was added. The mixture was then heated at temperatures between 111° and 193° C. for 3.5 hours, after which the product was separated as in Example 1. There was obtained 0.18 gram mol of 4-(alpha-cumenyl) phenyl di-4-tertiarybutyl-2-cyclohexylphenyl phosphate having the formula,

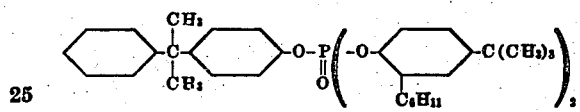

The product distilled at temperatures between 378° and 390° C. at 10 millimeters pressure and was at room temperature a hard yellowish resin.

The triaryl phosphate products described in the foregoing specific examples, and also those in the following table, were each analyzed and found to contain phosphorus in a proportion closely approximating that theoretically required according to the formula presented. Each phosphate described in the following table was prepared by procedure similar to that illustrated in the foregoing detailed examples.

The complex organic phosphates described in the foregoing examples were in some instances nearly colorless, but usually were yellow. It is believed that the yellow coloration was due to slight decomposition and that the pure compounds are colorless.

Other complex organic phosphates encompassed by the invention are di-(2,4-di-tertiary-butylphenyl) phenyl phosphate; tri-(5-tertiary-amyl-2-xenyl) phosphate; tri-[5-(3-methyl-cyclohexyl)-2-xenyl] phosphate; tri-(5-cumenyl-2-xenyl) phosphate; di-[4-(methyl-phenyl) phenyl] 2-xenyl phosphate; di-[2-ethyl phenyl phenyl] (5-tertiary butyl-2-xenyl phosphate; di-[4-(2-tertiarybutyl) xenyl] phenyl phosphate; etc. All such phosphates may be prepared as hereinbefore described.

Other modes of applying the principle of the invention may be employed instead of those explained, change being made as regards the method or compounds herein disclosed, provided the steps or compounds specified by any of the following claims or the equivalent of such steps or compounds be employed.

I therefore particularly point out and distinctly claim as my invention:

1. A complex organic phosphate having the formula,

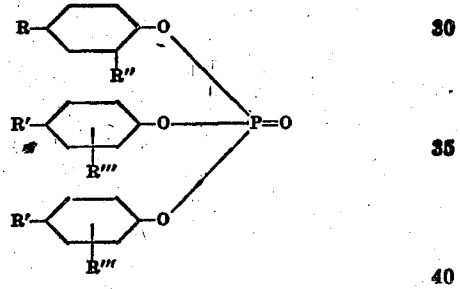

Table

| Product | Distilling temperatures, °C./mm. | Appearance at room temperature |
|---|---|---|
| (CH₃)₃C—⌬—O—P(O)—[O—⌬]₂ (with cyclohexyl substituent) | 344–349/6 | Nearly colorless transparent resin. |
| [(H₃C)₃C—⌬—O—]₂ P(O)—O—⌬ (with cyclohexyl substituent) | 324–330/6.5 | Do. |
| [(H₃C)₃C—⌬—O—]₂ P(O)—O—⌬—C(CH₃)₃ (with cyclohexyl substituent) | 350–360/5 | Do. |
| [H₃C—C(CH₃)₂—CH₂—C(CH₃)₂—⌬—O—]₃ P=O | About 365/10; decomposes during distillation. | Pale yellow resin. | wherein R is a radical selected from the class consisting of cycloalkyl radicals and hydrocarbon radicals containing at least four carbon atoms and attached through a tertiary carbon atom with the benzene nucleus, R' is a substituent selected from the class consisting of hydrogen and cycloalkyl radicals, aryl radicals, and hydrocarbon radicals containing at least four carbon atoms and attached through a tertiary carbon atom with the benzene nucleus, R'' is a substituent selected from the class consisting of tertiary alkyl, cycloalkyl, and aryl radicals, R''' is a substituent selected from the class consisting of hydrogen and tertiary alkyl, cycloalkyl and aryl radicals and at least two of the benzene nuclei linked with the phosphte radical have hydrocarbon substituents of the types just named, the total number of said hydrocarbon substituents on said benzene nuclei being at least four.

2. A complex organic phosphate having the general formula,

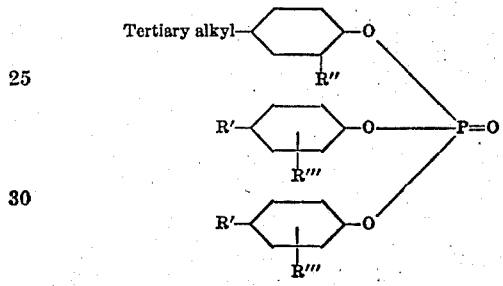

wherein R' is a substituent selected from the class consisting of hydrogen and cycloalkyl radicals, aryl radicals, and hydrocarbon radicals containing at least four carbon atoms and attached through a tertiary carbon atom with the benzene nucleus, R'' is a substituent selected from the class consisting of tertiary alkyl, cycloalkyl, and aryl radicals, R''' is a substituent selected from the class consisting of hydrogen and tertiary alkyl, cycloalkyl and aryl radicals, and at least two of the benzene nuclei linked with the phosphate radical have hydrocarbon substituents of the types just specified, the total number of said hydrocarbon substituents on said benzene nuclei being at least four.

3. A complex organic phosphate having the formula,

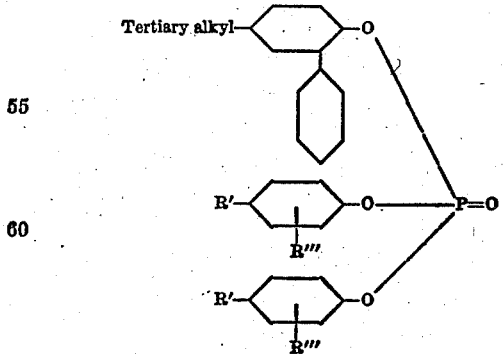

wherein R' is a substituent selected from the class consisting of hydrogen and cycloalkyl radicals, aryl radicals, and hydrocarbon radicals containing at least four carbon atoms and attached through a secondary or tertiary carbon atom with the benzene nucleus, R''' is a substituent selected from the class consisting of hydrogen and tertiary alkyl, cycloalkyl and aryl radicals, and at least two of the benzene nuclei attached to the phosphate radical have hydrocarbon substituents of the types just specified, the total number of said hydrocarbon substituents on said benzene nuclei being at least four.

4. 5-tertiarybutyl-2-xenyl di-(4-tertiarybutylphenyl) phosphate, a viscous liquid compound having the formula,

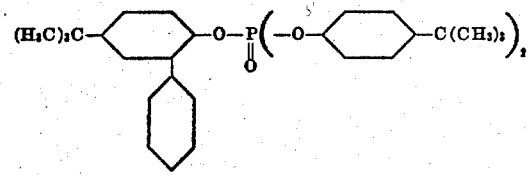

5. Tri-(5-tertiarybutyl-2-xenyl) phosphate, a solid compound having the formula,

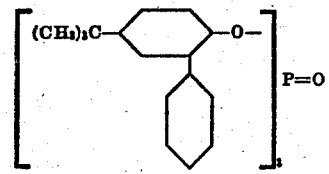

6. Di-(5-tertiarybutyl-2-xenyl) 4-tertiary-butylphenyl phosphate, a solid compound having the formula,

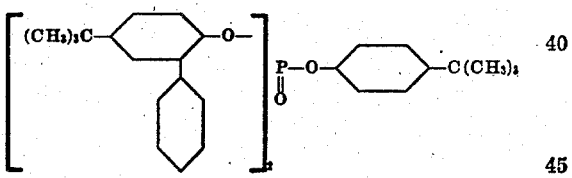

CLARENCE L. MOYLE.